(12) United States Patent
Bui et al.

(10) Patent No.: US 8,213,105 B2
(45) Date of Patent: Jul. 3, 2012

(54) CANCELLATION OF TIME-VARYING PERIODIC DISTURBANCES IN SERVO CONTROL SYSTEMS

(75) Inventors: Nhan X. Bui, Tucson, AZ (US);
Evangelos S. Eleftheriou, Rueschlikon (CH); Jens Jelitto, Rueschlikon (CH); Angeliki Pantazi, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 12/613,409

(22) Filed: Nov. 5, 2009

(65) Prior Publication Data
US 2011/0102934 A1 May 5, 2011

(51) Int. Cl.
G11B 21/02 (2006.01)
G11B 5/584 (2006.01)

(52) U.S. Cl. ........................... 360/75; 360/77.12
(58) Field of Classification Search ............ None
See application file for complete search history.

(56) References Cited

U.S. PATENT DOCUMENTS

| | | | |
|---|---|---|---|
| 4,280,159 A | 7/1981 | Nakayama | |
| 4,727,446 A | 2/1988 | Kaaden | |
| 4,972,288 A | 11/1990 | Nishida | |
| 5,276,576 A | 1/1994 | Tanaka | |
| 5,370,332 A | 12/1994 | Goff et al. | |
| 5,875,066 A | 2/1999 | Ottesen | |
| 6,082,653 A | 7/2000 | Abedor et al. | |
| 6,462,904 B1 | 10/2002 | Albrecht et al. | |
| 6,728,058 B1 | 4/2004 | Yonetani et al. | |
| 7,280,307 B2 | 10/2007 | Bui et al. | |
| 2002/0021514 A1 | 2/2002 | Bui et al. | |
| 2002/0034036 A1 | 3/2002 | Sri-Jayantha et al. | |
| 2003/0127551 A1 | 7/2003 | Abedor et al. | |
| 2005/0174681 A1 | 8/2005 | Berman et al. | |
| 2011/0043945 A1* | 2/2011 | Cherubini et al. | 360/77.12 |

FOREIGN PATENT DOCUMENTS

| | | |
|---|---|---|
| EP | 0840312 A1 | 5/1998 |
| JP | 59072211 A | 4/1984 |

OTHER PUBLICATIONS

International Search Report dated Nov. 24, 2010 for counterpart International Application No. PCT/EP2010/063345.

* cited by examiner

*Primary Examiner* — Daniell L Negron
*Assistant Examiner* — Regina N Holder
(74) *Attorney, Agent, or Firm* — Griffiths & Seaton PLLC (57) ABSTRACT

Various embodiments for addressing time-varying periodic disturbances in a servo control system are provided. Each of a plurality of coefficients is updated based on an estimation of at least one disturbance frequency. The updated plurality of coefficients is provided to at least one peak filter modifying an input signal of the servo control system. The peak filter is operable in view of the updated plurality of coefficients to cancel at least one of the time-varying periodic disturbances.

27 Claims, 7 Drawing Sheets

CANCELLATION OF TIME-VARYING PERIODIC DISTURBANCES IN SERVO CONTROL SYSTEMS

BACKGROUND OF THE INVENTION

1. Field of the Invention

The present invention relates in general to computers, and more particularly to a method, system, and computer program product for cancellation of time-varying periodic disturbances in servo control systems, such as in a magnetic tape drive system in a computing environment.

2. Description of the Related Art

Magnetic tape provides a means for physically storing data which may be archived or which may be stored in storage shelves of automated data storage libraries and accessed when required. Data stored in this manner has an aspect of permanence, which allows copies of the data stored in memory or disk at a host system to be erased, knowing that a copy exists on magnetic tape. The available storage space at the host system is relatively expensive, and there is a desire to release the storage space as soon as possible. Hence, data is typically transferred through an intermediate staging buffer, such as a hard disk, to the tape drive.

SUMMARY OF THE INVENTION

Many tape drives include a so-called track-follow control system. Track-follow control systems function to move the tape head such that the tape head follows the centerline of the data tracks as accurately as possible during read/write operations. At time of manufacture, the magnetic tape is written with servo stripes. These servo stripes are used to derive a Position Error Signal (PES), which is then used as a feedback mechanism to position the head accurately. The PES signal measures the error between the target track location and the head location on the lateral direction. The head should be able to follow the data tracks in the presence of disturbances mainly created from the lateral tape motion (LTM) of the tape.

To achieve higher track densities in tape drive systems, it is beneficial that LTM be significantly reduced or that LTM behaves such that the track-follow system can follow it. In current drives, typically flanged rollers transport the tape between the reels. The flanges limit the motion of the tape, but introduce debris accumulation on the flanges that impacts the lifetime of the tape and creates undesirable dynamic effects. One solution to this problem is to remove the flanges. By removing the flanges there is no constraint on the motion of the tape, and effects from the eccentricity of the machine and/or file reels become more pronounced. These effects contribute to the PES signal and thereby amount to a limiting factor to track density. The LTM created from the reels appears on the PES signal as periodic disturbances with frequencies that vary depending upon the radii of the reels. These periodic disturbances will be further explained throughout the following.

An effective track-follow control system should be able to follow these disturbance effects created by the reels. The feedback control techniques that are currently used, however, are based on PID, lead-lag or estimator/controller designs where the disturbance dynamics are not included in the design phase. Even if structures like the Internal Model Principle (IMC) are used, the fact that the frequencies of the disturbances are changing requires online identification that makes implementation of such a system difficult.

In light of the foregoing, a need exists for an efficient and effective mechanism for addressing the periodic disturbance effects described above providing an improvement on current techniques. Accordingly, various embodiments for addressing time-varying periodic disturbances in a servo control system using a processor device are provided. In one embodiment, by way of example only, each of a plurality of coefficients is updated based on an estimation of at least one disturbance frequency. The updated plurality of coefficients is provided to at least one peak filter modifying an input signal of the servo control system. The at least one peak filter is operable in view of the updated plurality of coefficients to cancel at least one of the time-varying periodic disturbances.

Related method, system, and computer program product embodiments are provided and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments and claimed subject matter provide mechanisms for track-follow control incorporating a peak filter module for cancellation of time-varying periodic components that may originate by the tape reels or from additional sources. In addition to the use of the peak filtering functionality, which will be described in further detail, following, the illustrated embodiments and claimed subject matter provide adaptive methodologies that may be used to appropriately modify coefficients provided to the peak filter module in order to account for variations of disturbance frequencies.

In one embodiment, the mechanisms of the present invention stem from the idea that the frequency of a particular periodic disturbance is based on the radius of the tape reel. In one example, an estimate of the radius of the reel may be obtained at a particular point in time while the tape drive is operating using the LPOS location (position on the tape in the longitudinal direction). Using this radius estimate, the frequency of the time-varying disturbance may be estimated. Then, using the estimated frequency, the coefficients of the filter are adjusted. An example methodology in which coefficients of the filter are calculated based on the desired peak frequency is described further, following.

The illustrated embodiments of exemplary track-follow control architecture provide significant improvement in the cancellation of the periodic disturbance effects. Furthermore, there is no requirement for online identification of the disturbances. Use of a fixed peak filter may attenuate the disturbance effect in some frequency region. However, when the time-varying periodic disturbance is far from that region, undesirable effects may appear. The following adaptive methodologies serve to account for the possibility of these undesirable effects as will be further described.

A description of the illustrated embodiments of the present invention and initial experimental results are provided, following. Specifically, a characterization of the disturbances in the track-follow system shows the importance of the time-varying periodic disturbance cancellation. Experimental results verify that the radius estimates provide a good estimate of the peak frequencies observed in the PES signal, both in forward and backward direction of the tape motion. The illustrated embodiments and accompanying experimental results demonstrate improvement on the PES standard deviation using embodiments according to the present invention as compared to traditional implementations. Additional embodiments are also described where aspects of the present invention are applied in an implementation of a track-follow compensator designed using state space techniques.

Figure 1:
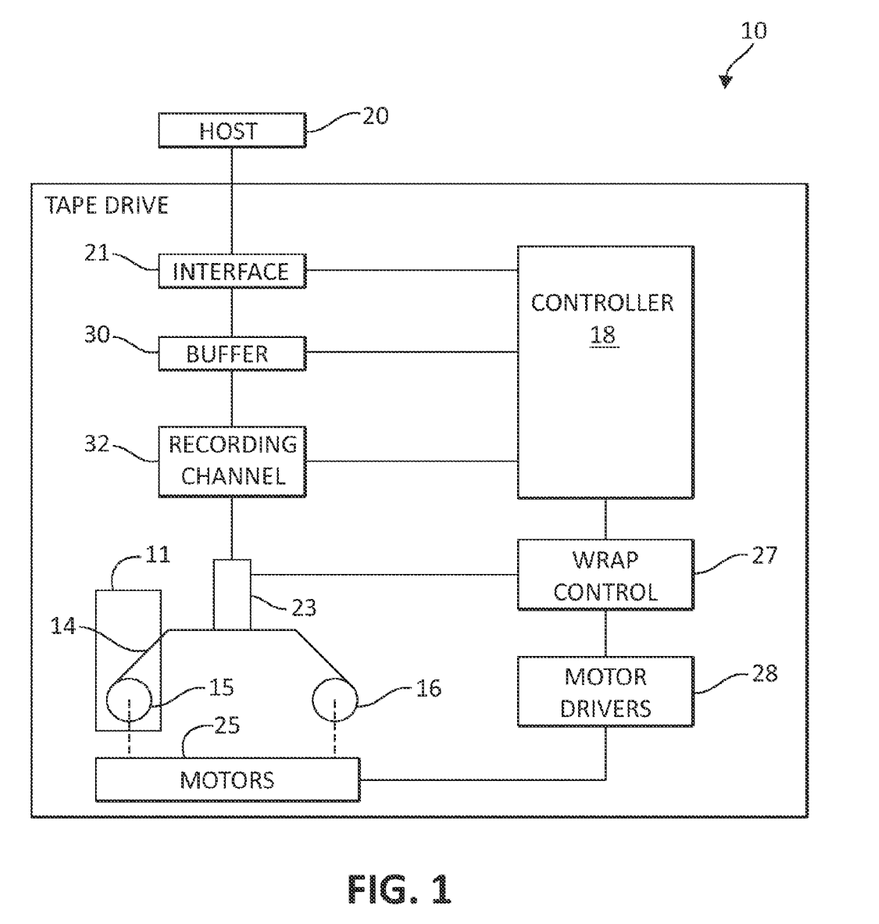
FIG. 1 is a block diagram of an exemplary magnetic tape drive with a magnetic tape cartridge capable of implementing various aspects of the present invention.

Referring to FIG. 1, a tape drive 10 is illustrated which may implement aspects of the present invention. The tape drive provides a means for reading and writing information with respect to a magnetic tape cartridge 11. A cartridge and associated tape drive are illustrated, such as those adhering to the Linear Tape Open (LTO) format. An example of a single reel tape drive is the IBM® 3580 Ultrium® magnetic tape drive based on LTO technology. Another example of a single reel tape drive is the IBM® 3590 Magstar® magnetic tape drive and associated magnetic tape cartridge. An example of a dual reel cartridge is the IBM® 3570 magnetic tape cartridge and associated drive.

As is understood by those of skill in the art, a magnetic tape cartridge 11 comprises a length of magnetic tape 14 wound on one or two reels 15, 16. Also as is understood by those of skill in the art, a tape drive 10 comprises one or more controllers 18 of a recording system for operating the tape drive in accordance with commands received from a host system 20 received at an interface 21. The tape drive may comprise a standalone unit or comprise a part of a tape library or other subsystem. The tape drive 10 may be coupled to the host system 20 directly, through a library, or over a network, and employ the Small Computer Systems Interface (SCSI), Fibre Channel Interface, etc.

The magnetic tape cartridge 11 may be inserted in the tape drive 10, and loaded by the tape drive so that one or more read and/or write heads 23 of the recording system reads and/or writes information with respect to the magnetic tape 14 as the tape is moved longitudinally by one or more motors 25. The magnetic tape comprises a plurality of parallel data tracks, or groups of data tracks. In some formats, such as the LTO format, discussed above, the data tracks are arranged in a serpentine back and forth pattern of separate wraps, as is known to those of skill in the art. Also as known to those of skill in the art, the recording system comprises a wrap control system 27 to electronically switch to another set of read and/or write heads, and/or to seek and move the read and/or write heads 23 laterally relative to the magnetic tape, to position the heads at a desired wrap or wraps, and, in some embodiments, to track follow the desired wrap or wraps. The wrap control system may also control the operation of the motors 25 through motor drivers 28, both in response to instructions by the controller 18. Controller 18 also provides the data flow and formatting of data to be read from and written to the magnetic tape, employing a buffer 30 and a recording channel 32, as is known to those of skill in the art.

As discussed above, magnetic tape provides a means for physically storing data that may be archived or that may be stored in storage shelves of automated data storage libraries and accessed when required. Tape drives often employ a "read after write" process to insure that the data is written correctly to provide an aspect of permanence. This permanence allows copies of the data stored in memory or disk at the host system 20 to be erased, knowing that a correct copy exists on magnetic tape.

The illustrated embodiments account for the notion that at least a portion of LTM is caused by periodic components. Tape drive systems typically operate in multiple tape speeds. In some systems, for example, these speeds range from 1.64 m/s (denoted as s1) to 6.29 m/s (denoted as s6) for LTO-4 formatted drives. In flanged drive systems, stationary periodic disturbances may be observed to follow roller frequencies. In flangeless drive systems, eccentricity effects from the mechanical components and/or file reels may also be observed to be periodic in nature, and may vary depending on the radius of the reels.

Figure 2:
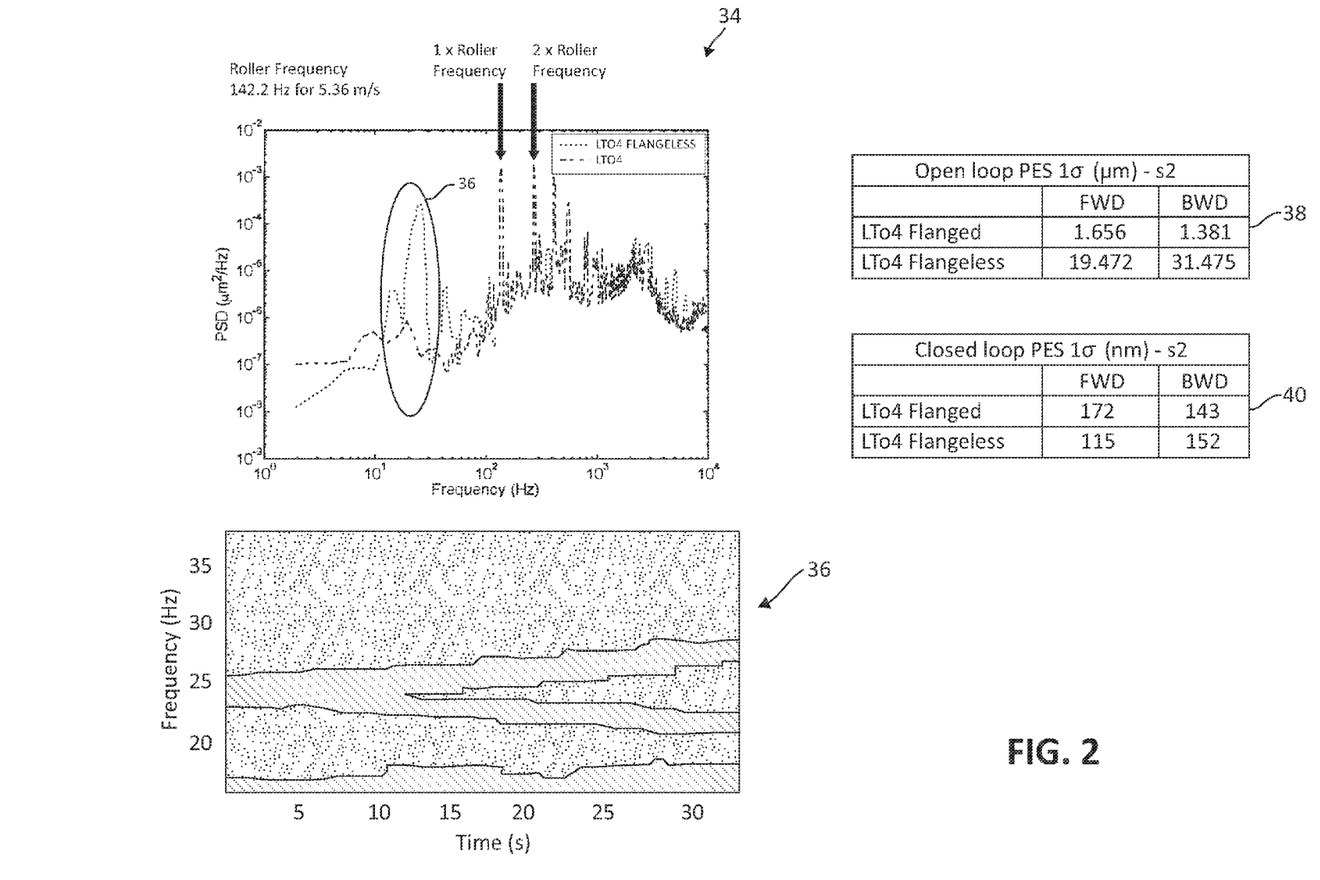
FIG. 2 depicts graph diagrams and tables showing exemplary periodic disturbances in LTO-4 formatted tape performance.

FIG. 2, following, depicts exemplary graphs and tables illustrating track-follow closed loop performance in LTO-4 formatted tape drives. Graph 34 for example depicts a graph of power spectral density (PSD) measured in square micrometers per Hz against frequency (in Hz). PSD characteristics of exemplary LTO-4 tape systems having reel flanges are juxtaposed against PSD characteristics of exemplary flangeless LTO-4 systems as shown, where an exemplary roller frequency of 142.2 Hz for 5.36 m/s is sampled. Circled area 36 highlights an exemplary area where periodic disturbance is seen, which is more specifically illustrated in graph 36, where a spectrogram of the position error signal (PES) is seen by frequency versus time, as the skilled artisan will appreciate.

Returning to graph 34, additional disturbance peaks for the flanged system are seen at 1 times and 2 times the sampled roller frequency. Tables 38 and 40 depict the standard deviation of the open and closed loop PES for both LTO-4 flanged and flangeless systems, illustrating a comparison thereof in the forward and backward direction. As seen, the flangeless system, for example, exhibits additional open loop LTM effects.

Figure 3:
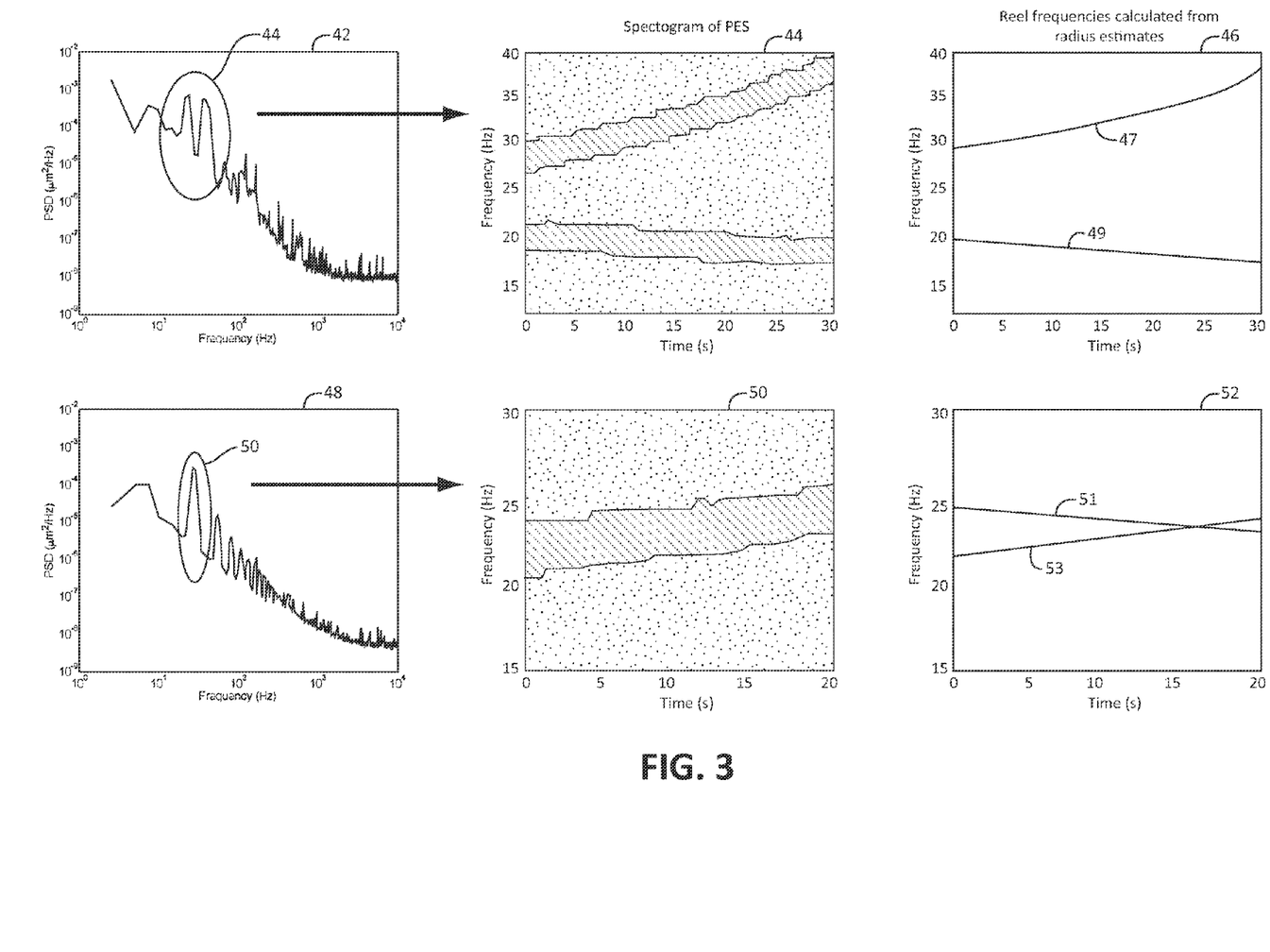
FIG. 3 depicts graph diagrams of LTO-4 formatted tape illustrating LTM effects in forward and reverse directions.

FIG. 3, following, depicts additional exemplary graphs illustrating LTM effects for LTO-4 formatted drives with flangeless rollers in both forward and backward directions. Graphs 42, 44, and 46 illustrate such effects in the forward direction, and graphs 48, 50, and 52 illustrate such effects in the backward direction. In graphs 42 and 48, the PSD of the drive as against frequency is again seen, with periodic disturbance effects highlighted in areas 44 and 50. Spectrograms of each PES seen in graphs 42 and 48 are then derived and shown in graphs 44 and 50.

In the forward direction (again as illustrated in graphs 42, 44, and 46), the outboard reel radius decreases, and thereby the reel frequency increases. In the backward direction (again as illustrated in graphs 48, 50, and 52), the inboard reel radius decreases, and thereby the reel frequency increases.

Radius estimates, as shown in graphs 46 and 52, respectively, may be used to calculate estimates of peak reel frequencies observed in the PES signals, where in graph 46 the supply reel frequency is shown in line 47 and the take-up reel frequency is shown in line 49, and in graph 52 the supply reel frequency is shown in line 51 and the take-up reel frequency is shown in line 53. In one embodiment, the following equations may be used to calculate such estimations:

$$F_{sr} = \frac{v_{tape}}{2\pi R_{sr}}, \text{ and} \quad (1)$$

$$F_{tur} = \frac{v_{tape}}{2\pi R_{tur}}; \quad (2)$$

where $F_{sr}$ and $F_{tur}$ are the frequencies of the supply reel and take-up reel, respectively,
$R_{sr}$ and $R_{tur}$ are radii of the supply reel and take-up reel, respectively, and
$v_{tape}$ is the sampled velocity of the magnetic tape.

Figure 4:
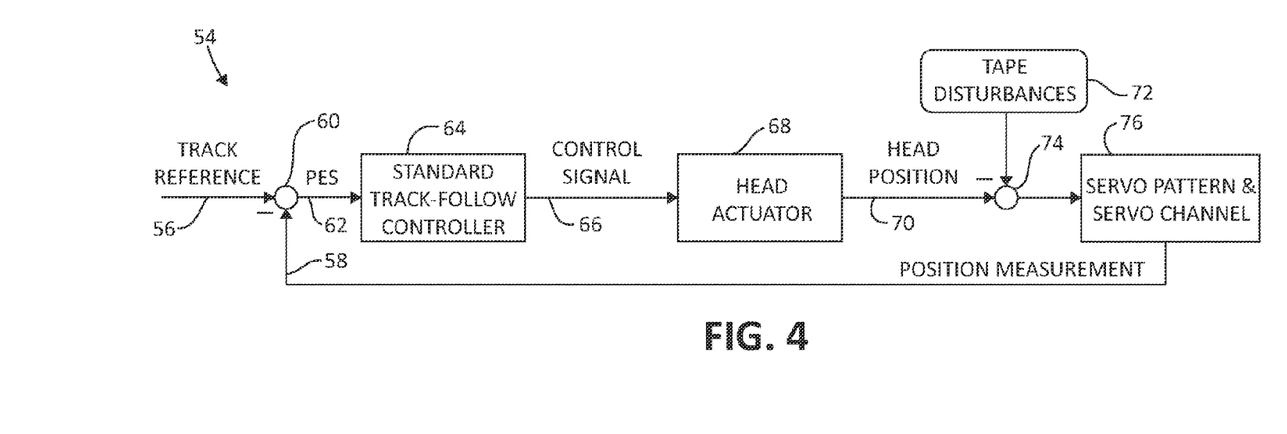
FIG. 4 is a block diagram of an exemplary track-follow control system.

Turning now to FIG. 4, a block diagram of an exemplary track-follow control system 54 is depicted. System 54 inputs a track reference signal 56. Track reference signal 56 corresponds to a desired track location on the magnetic tape. Track reference signal 56 is subtracted from a position measurement signal 58 in node 60 to generate a PES 62. The PES 62 measures the error between the target track location on the tape and the position of the tape head. PES 62 is then provided to track-follow controller 64.

The controller 64 then provides a control signal 66 to the head actuator 68 responsible for positioning the tape head. Head actuator 68 is used to position the servo reader at a desired lateral position of the servo pattern so as to position the read/write head elements in the center of the target tracks to be read/written. A tape disturbances (LTM) 72 is subtracted from head position signal 70 in node 74, with the result provided to servo pattern and servo channel 76. The tape servo pattern and the servo channel implementation 76 are used to provide a position measurement 58 of the head in respect to the servo pattern, which then provides the position measurement 58 back to node 60 as shown as a feedback mechanism.

Figure 5:
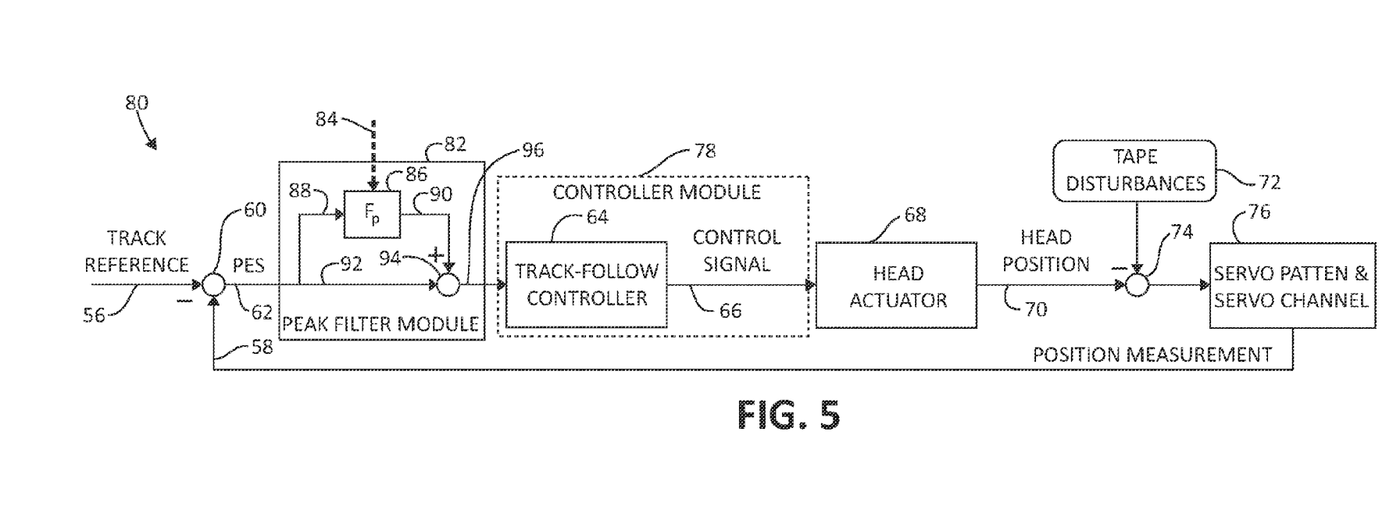
FIG. 5 is a block diagram of an exemplary track-follow control system including a peak filter module for addressing periodic disturbances.

FIG. 5 depicts a proposed exemplary track-follow control system 80, which incorporates a peak filter module 82 to provide cancellation functionality for periodic LTM effects seen in the overall tape drive system according to the present invention. Here, as in FIG. 4, a track reference signal 56 is provided to node 60, which is subtracted from position measurement signal 58 to obtain a PES 62. PES 62 is then provided to the peak filter module 82. The PES signal 62 is inputted by the peak filter module 82 and provided to a peak filter 86 by signal 88. A number of peak filter coefficients 84 are calculated and provided to the peak filter 86, and are operable on the signal 88. The output signal 90 of peak filter 86 is then provided to node 94, where the PES is added to the output signal 90. The resulting peak filter module output signal 96 is then provided to controller module 78, which includes track-follow controller 64. Controller 64 uses the result 96 to generate control signal 66, which is then provided to the head actuator 68. In a manner similar to that described in FIG. 4, the head position is subtracted by the LTM information and provided to the servo pattern and control channel 76, which then provides the position measurement 58 back to the node 60 as a feedback mechanism.

Peak filter module 82 uses peak filter 86 to cancel periodic component(s) from the tape drive system. In one embodiment, this includes cancellation of periodic components relating to the reel motion. In addition, other narrowband disturbances may be targeted and filtered accordingly according to a particular implementation and as the skilled artisan will appreciate. Filter coefficients 84 may be updated using an estimated radius at a particular time to account for the time-varying frequency effects of the reel and for other system components. Such an adaptive methodology functions to appropriately modify the coefficients of the peak filter 86 in order to account for the variations of the particular disturbance frequency. In one embodiment, a current compensator may be used as track-follow controller 64. In order for the mechanisms of the present invention to properly function, a reduction of track-follow controller gain may be needed to account for an increase in DC (direct current) gain from added electronic components. Again, such a reduction may be implemented according as the skilled artisan may prefer. In one embodiment, a current compensator may be instead replaced with a state space design, of which an exemplary design will be described further below.

Figure 6:
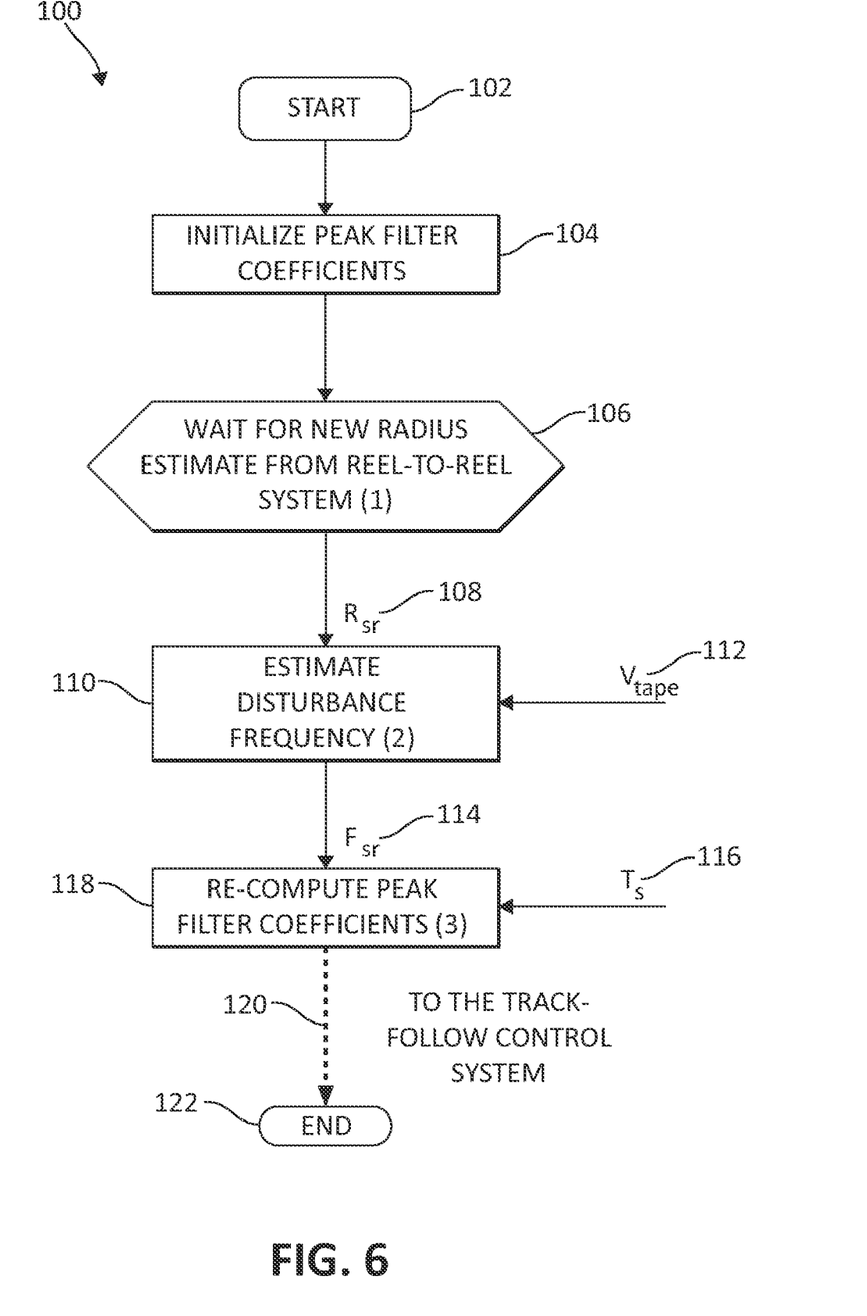
FIG. 6 is a flow chart diagram of an exemplary method for computing peak filter coefficients provided to a track-follow control system.

Turning now to FIG. 6, a flow chart diagram for an exemplary method 100 for computation of peak filter coefficients is depicted. As one skilled in the art will appreciate, various steps in the method 100 may be implemented in differing ways to suit a particular application. In addition, the described method may be implemented by various means, such as hardware, software, firmware, or a combination thereof operational on or otherwise associated with the magnetic tape drive. For example, the method 100 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 100 begins (step 102) with the initialization of peak filter coefficients (step 104). As a following step, the method 100 waits for a new reel radius estimate (obtained at a particular point in time), which is used to assist in calculation (step 106). The radius estimate may be obtained for the supply reel or for the take-up reel, depending, for example, on whether the drive is operational in a forward or backward direction. In the example shown in FIG. 6 for the current method 100, the radius estimate for the supply reel, $R_{sr}$ 108, is obtained.

The supply reel radius estimate is used in conjunction with the velocity of the tape, $v_{tape}$ 112, to estimate the applicable disturbance frequency at the sampled time (step 110). Here again, the equations (1) or (2) provided above may be utilized to derive the disturbance frequency in question, $F_{sr}$ 114. The target velocity may be used as $v_{tape}$. In addition (and perhaps preferable in some embodiments), the estimated velocity from the reel-to-reel system may be used. This may provide a better estimate during acceleration and/or deceleration of the magnetic tape.

As a next step, the disturbance frequency 114 is used in conjunction with the sampling time, $T_s$ 116, to compute (or re-compute as the case may be) the peak filter coefficients (step 118). In one embodiment, the computation of coefficients based on a desired peak frequency is described by A. Mamun, et al. in "Hard Disk Drive: Mechatronics and Control" published by Control Engineering Series, the relevant portions thereof incorporated herein by reference. In additional embodiments, an additional methodology may involve the use of a look-up table of possible frequencies and corresponding coefficients. In this case, it is beneficial that the frequency range addressed by the look-up table correspond to an operating range of the applicable reel radius (supply reel or take-up reel) and the possible tape velocities. As a final step in method 100, the peak filter coefficients 120 are then provided to the track-follow control system, and the method 100 ends (step 122).

In another embodiment, the foregoing mechanisms may be applied in the case of a track-follow control system designed using advanced state-space techniques. One such technique is the Linear Quadratic Gaussian (LQG) optimal control. This technique allows for account of the actuator dynamics, as well as the position measurement noise and delays. Such a track-follow control system provides two degrees of freedom, since both PES and the position measurement are entered as inputs to the system.

Figure 7:
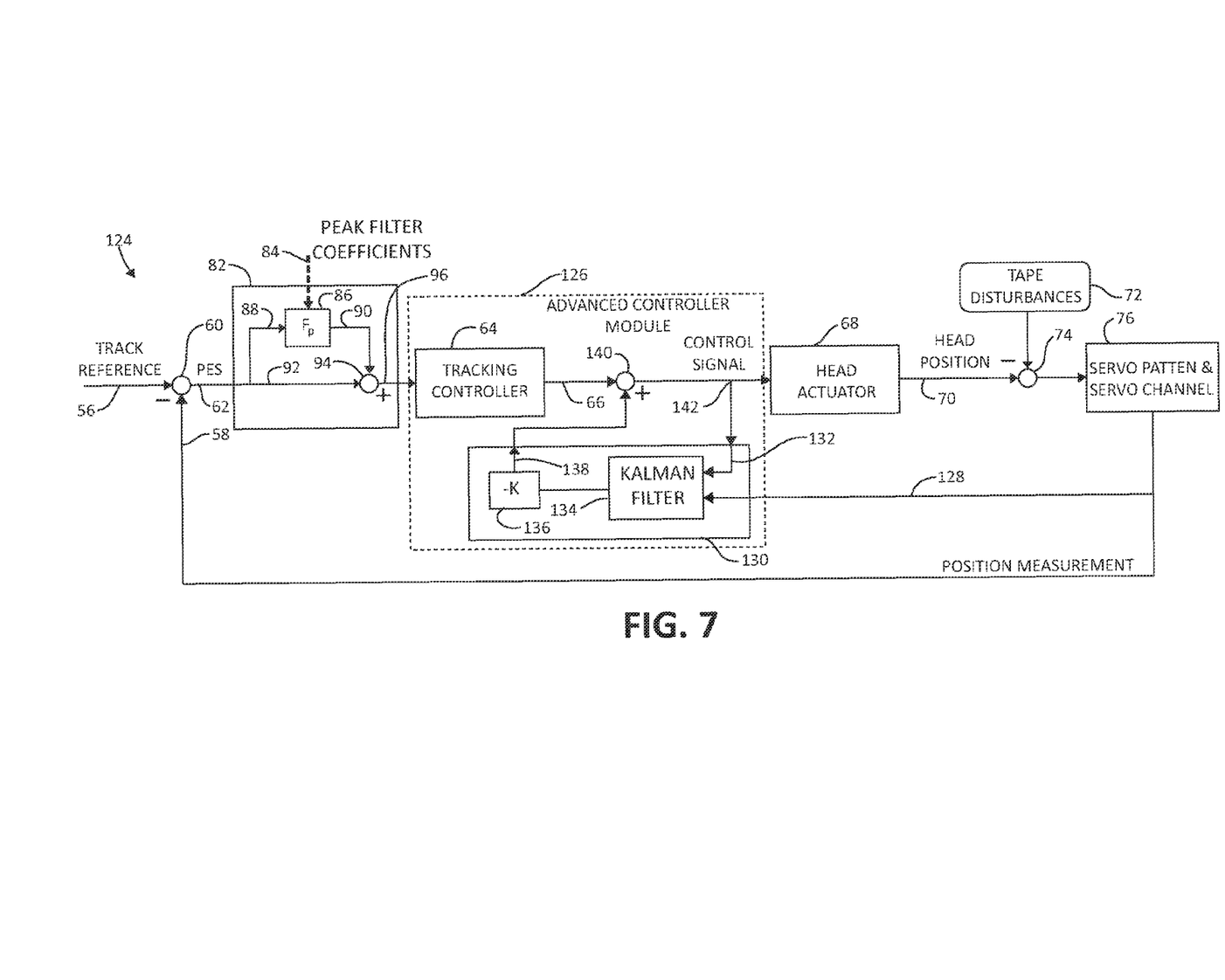
FIG. 7 is a block diagram of an additional exemplary track-follow control system incorporating Linear Quadratic Gaussian (LQG) optimal control.

Turning now to FIG. 7, following, such a LQG enhancement is shown as incorporated into an advanced track-follow control system 124. Here as before, system 124 includes such components as the peak filter, with the result 96 of node 94 provided to an advanced controller module 126. Controller module 126 inputs the result 96 of node 94 into the tracking controller 64, and the output of controller 64 (shown as signal 66) is added to the output of LQG control module 130 in node 140.

LQG control module 130 inputs are position measurement signal 128, along with the control signal 142 fed back as signal 132 to a Kalman filter 134, in which the output thereof is provided to current compensator module 136. Output 138 of the compensator module 136 is then provided to the node 140 as shown.

Figure 8:
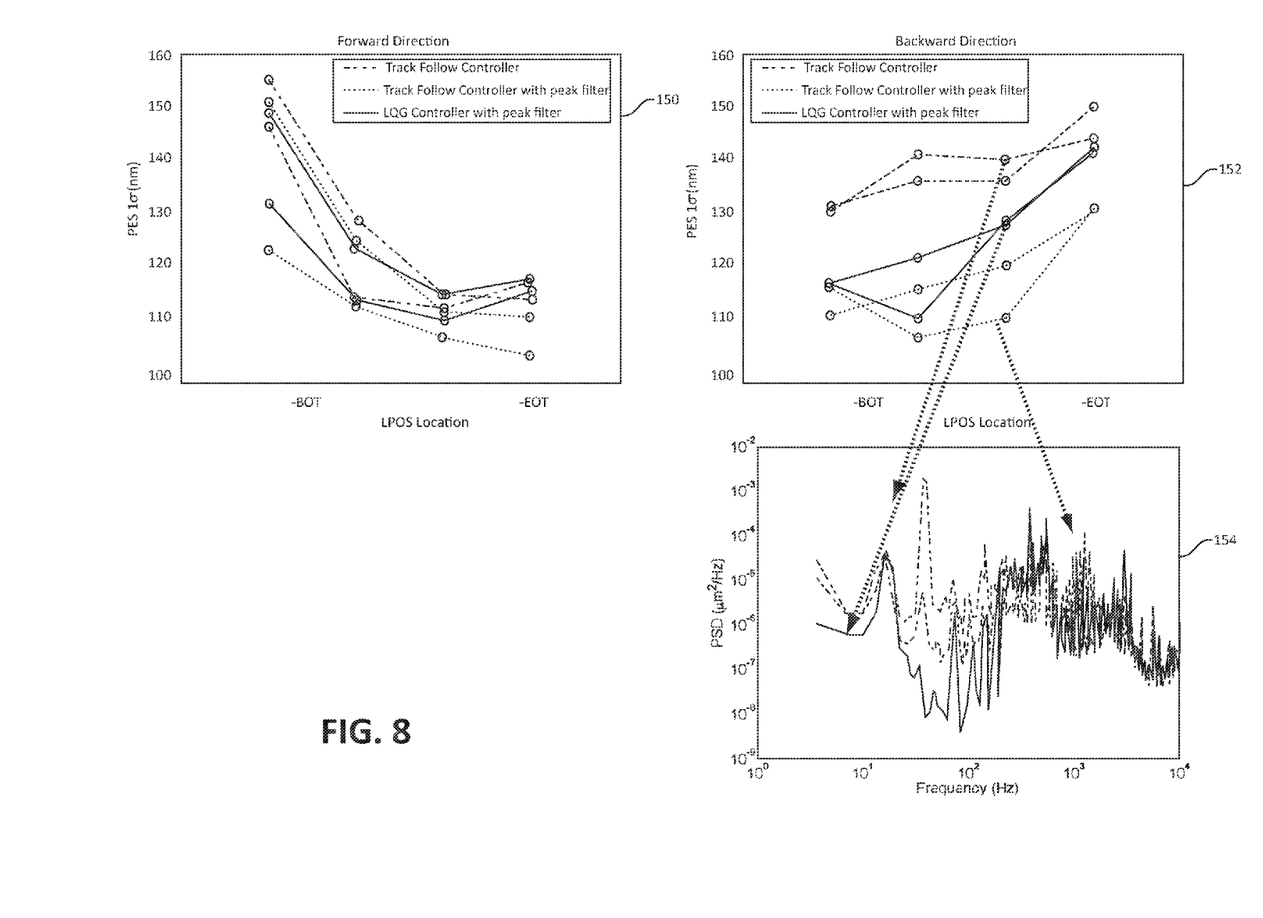
FIG. 8 depicts graph diagrams of exemplary experimental results using a standard track-follow controller, and additional track-follow controllers incorporating aspects of the present invention.

FIG. 8 includes graphs 150, 152, and 154 illustrating various experimental results obtained in both the forward and backward direction at differing LPOS locations. The depicted results were obtained for an experiment utilizing two different cartridges with speed s2, for various controller systems, including a track-follow controller, a track follow controller with peak filtering functionality, and an advanced track-follow controller incorporating LQG optimal control functionality as shown. In the depicted embodiment, the various peak filter coefficients were updated at approximately every 800 microseconds. As the skilled artisan will appreciate, improved disturbance rejection is shown at the reel frequency as shown in graph 154, and improved PES standard deviation is shown in all cases in graphs 150 and 152. In the depicted results, more improvement in the backward direction is seen versus the forward direction, although this may vary depending on implementation and type of system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for addressing time-varying periodic disturbances in a servo control system, comprising:
   continuously updating, in real-time, each of a plurality of coefficients based on at least estimating a varying disturbance frequency generated by a varying radius of a magnetic tape reel, the disturbance frequency varying as the radius varies in size;
   providing, in real-time, the continuously updated plurality of coefficients in real time to at least one peak filter;
   continuously modifying, in real-time, an input signal of the servo control system in response to receiving the continuously updated plurality of coefficients, wherein the peak filter is operable in view of the continuously updated plurality of coefficients to cancel the varying disturbance frequency generated by the varying radius; and
   continuously adjusting, in real-time, a position of a magnetic tape track following device in response to receiving the continuously modified input signal,
   wherein the continuously updating each of the plurality of coefficients is performed both when the magnetic tape reel is moving in a forward direction and moving in a backward direction.

2. The method of claim 1, further including initializing each of the plurality of coefficients.

3. The method of claim 1, wherein the continuously updating each of the plurality of coefficients includes obtaining a current estimation of the radius.

4. The method of claim 3, wherein obtaining the current estimation of the radius includes obtaining a current estimation of at least one of an outboard magnetic tape reel radius and an inboard magnetic tape reel radius.

5. The method of claim 3, wherein:
   the continuously updating each of the plurality of coefficients includes estimating at least one disturbance frequency as a function of an estimated magnetic tape velocity and the radius; and
   the peak filter is further operable in view of the continuously updated plurality of coefficients to cancel the estimated magnetic tape velocity.

6. The method of claim 5, wherein the continuously updating each of the plurality of coefficients further includes computing each of the plurality of coefficients as a function of the varying disturbance frequency taken at various sampling times.

7. The method of claim 3, wherein the continuously updating each of the plurality of coefficients includes estimating the disturbance frequency based on the current estimation of the radius using a lookup table having a range of disturbance frequencies corresponding to each of an operating range of the radius and an operating range of magnetic tape velocities.

8. A method for addressing time-varying periodic disturbances in a track-follow servo control system in a magnetic tape drive of a computing environment, comprising:
   obtaining, in real-time, a current estimation of a varying radius of a magnetic tape reel;
   continuously updating, in real-time, each of a plurality of coefficients based on at least one estimation of a varying disturbance frequency generated by the varying radius, the disturbance frequency radius varies in size;
   providing, in real-time, the continuously updated plurality of coefficients to at least one peak filter;
   continuously modifying an input signal of the track-follow servo control system, wherein the peak filter is operable in view of the continuously updated plurality of coefficients to cancel the varying disturbance frequency generated by the varying radius; and
   continuously adjusting, in real-time, a position of one of a read head, a write head, and a read/write head on a magnetic tape in response to the continuously modified input signal,
   wherein the continuously updating each of the plurality of coefficients is performed both when the magnetic tape reel is moving in a forward direction and moving in a backward direction.

9. The method of claim 8, further including initializing each of the plurality of coefficients.

10. The method of claim 8, wherein the obtaining the current estimation of the radius includes obtaining a current estimation of at least one of an outboard magnetic tape reel radius and an inboard magnetic tape reel radius.

11. The method of claim 8, wherein:
   the continuously updating each of the plurality of coefficients includes estimating the disturbance frequency as a function of one of an estimated magnetic tape velocity, a target magnetic tape velocity, and the current estimation of the radius; and
   the peak filter is further operable in view of the continuously updated plurality of coefficients to cancel the one of an estimated magnetic tape velocity, a target magnetic tape velocity, and the current estimation of the radius.

12. The method of claim 11, wherein the continuously updating each of the plurality of coefficients further includes computing each of the plurality of coefficients as a function of the varying disturbance frequency taken at various sampling times.

13. The method of claim 8, wherein the continuously updating each of the plurality of coefficients includes estimating the disturbance frequency based on the current estimation of the radius using a lookup table having a range of disturbance frequencies corresponding to each of an operating range of the radius and an operating range of magnetic tape velocities.

14. The method of claim 8, further including providing a position measurement signal to a reference signal to obtain a Position Error Signal (PES), wherein the PES is provided to the at least one peak filter to obtain a modified PES, the modified PES provided to the track-follow servo control system.

15. The method of claim 14, further including providing the position measurement signal to a Linear Quadratic Gaussian (LQG) control system, wherein the LQG control system is integrated into the track-follow servo control system.

16. A system for addressing time-varying periodic disturbances in a track-follow servo control system in a magnetic tape drive of a computing environment, comprising:
a tracking controller module; and
a filter module in communication with the tracking controller module, wherein the filter module is adapted for:
obtaining, in real-time, a current estimation of a varying radius of a magnetic tape reel,
continuously updating, in real-time, each of a plurality of coefficients based on at least estimating a varying disturbance frequency generated by the varying radius, the disturbance frequency varying as the radius varies in size,
processing the continuously updated plurality of coefficients through at least one peak filter,
continuously modifying an input signal of the track-follow servo control system, wherein the at least one peak filter is operable in view of the updated plurality of coefficients to cancel the varying disturbance frequency generated by the varying radius, and
continuously adjusting, in real-time, a position of one of a read head, a write head, and a read/write head on a magnetic tape in response to the continuously modified input signal,
wherein the continuously updating each of the plurality of coefficients is performed both when the magnetic tape reel is moving in a forward direction and moving in a backward direction.

17. The system of claim 16, wherein the filter module is further adapted for initializing each of the plurality of coefficients.

18. The system of claim 16, wherein the filter module is further adapted for, pursuant to the obtaining the current estimation of the radius, obtaining a current estimation of at least one of an outboard magnetic tape reel radius and an inboard magnetic tape reel radius.

19. The system of claim 16, wherein:
the filter module is further adapted for, pursuant to the continuously updating each of the plurality of coefficients, obtaining the at least one estimation of the disturbance frequency as a function of one of an estimated magnetic tape velocity and a target magnetic tape velocity and the radius, and
the peak filter is further operable in view of the continuously updated plurality of coefficients to cancel the one of the estimated magnetic tape velocity and the target magnetic tape velocity and the radius.

20. The system of claim 19, wherein the filter module is further adapted for, pursuant to the continuously updating each of the plurality of coefficients, computing each of the plurality of coefficients as a function of the varying disturbance frequency taken a various sampling times.

21. The system of claim 16, wherein the filter module is further adapted for, pursuant to the continuously updating each of the plurality of coefficients, obtaining the at least one estimation of the disturbance frequency based on the current estimation of the radius using a lookup table having a range of disturbance frequencies corresponding to each of an operating range of the radius and an operating range of magnetic tape velocities.

22. The system of claim 16, wherein the filter module includes an input for receiving a Position Error Signal (PES) and an output providing a modified PES to the tracking controller module, wherein the PES is obtained by a difference between the input signal and a position measurement signal.

23. The system of claim 22, further including a Linear Quadratic Gaussian (LQG) control system having an output added to an output of the tracking controller module, wherein the LQG control system is adapted for modifying the position measurement signal to reduce noise of the output of the tracking controller module.

24. A computer program product for addressing time-varying periodic disturbances in a track-follow servo control system in a magnetic tape drive of a computing environment using a processing device, the computer program product comprising a non-transitory computer-readable storage medium having computer-readable program code portions stored therein, the computer-readable program code portions comprising:
a first executable portion for obtaining, in real-time, a current estimation of a varying radius of a magnetic tape reel;
a second executable portion for continuously updating, in real-time, each of a plurality of coefficients based on at least estimating a varying disturbance frequency generated by the varying radius, the disturbance frequency the radius varies in size;
a third executable portion for providing the continuously updated plurality of coefficients to at least one peak filter;
a fourth executable portion for continuously modifying, in real-time, an input signal of the track-follow servo control system, wherein the at least one peak filter is operable in view of the continuously updated plurality of coefficients to cancel the varying disturbance frequency generated by the varying radius; and
a fifth executable portion for continuously adjusting, in real-time, a position of one of a read head, a write head, and a read/write head on a magnetic tape in response to the continuously modified input signal,
wherein the continuously updating each of the plurality of coefficients is performed both when the magnetic tape reel is moving in a forward direction and moving in a backward direction.

25. The computer program product of claim 24, further including a sixth executable portion for, pursuant to the obtaining the current estimation of the radius, obtaining a current estimation of at least one of an outboard magnetic tape reel radius and an inboard magnetic tape reel radius.

26. The computer program product of claim 25, further including a seventh executable portion for, pursuant to the continuously updating each of the plurality of coefficients, obtaining the estimation of the at least one the disturbance frequency as a function of one of an estimated magnetic tape velocity, a target magnetic tape velocity, and the radius,
wherein the peak filter is further operable in view of the continuously updated plurality of coefficients to cancel the one of the estimated magnetic tape velocity and the target magnetic tape velocity and the radius.

27. The computer program product of claim 24, further including a fifth executable portion for, pursuant to the continuously updating each of the plurality of coefficients, computing each of the plurality of coefficients as a function of the varying disturbance frequency taken at various sampling times.

* * * * *